(12) United States Patent
Rienas

(10) Patent No.: US 6,659,386 B1
(45) Date of Patent: Dec. 9, 2003

(54) METHOD AND APPARATUS FOR CONTACTLESS YARN MONITORING IN A SPINNING OR BOBBIN WINDING MACHINE

(75) Inventor: Gerhard Rienas, Heinsberg (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/459,667

(22) Filed: Dec. 13, 1999

(30) Foreign Application Priority Data

Dec. 17, 1998 (DE) .......................................... 198 58 287

(51) Int. Cl.⁷ .............................................. B65H 54/28
(52) U.S. Cl. ................................................... 242/478.2
(58) Field of Search ........................ 242/478.2, 487.3, 242/476.7; 57/264

(56) References Cited

U.S. PATENT DOCUMENTS

| | | | |
|---|---|---|---|
| 3,441,738 A | 4/1969 | Dosch et al. ........... | 250/559.24 |
| 4,838,500 A | * 6/1989 | Graham ................... | 242/478.2 |
| 4,931,658 A | 6/1990 | Tole | |
| 5,054,317 A | 10/1991 | Laubscher ................... | 73/160 |
| 5,074,481 A | * 12/1991 | Kathke .................... | 242/478.2 |
| 5,078,333 A | * 1/1992 | Hester ..................... | 242/478.2 |
| 5,209,414 A | * 5/1993 | Clemens et al. ..... | 242/478.2 X |
| 5,421,529 A | 6/1995 | Hans .......................... | 242/470 |
| 6,123,283 A | * 9/2000 | Hayashi et al. ...... | 242/487.3 X |

FOREIGN PATENT DOCUMENTS

| | | |
|---|---|---|
| CH | 643 060 A5 | 5/1984 |
| CH | 669 615 A5 | 3/1989 |
| DE | 1 560 382 | 9/1970 |
| DE | 26 02 465 C2 | 7/1977 |
| DE | 35 37 195 A1 | 4/1987 |
| DE | 87 16 008 | 5/1988 |
| DE | 41 40 952 A1 | 6/1993 |
| EP | 0 401 600 A2 | 12/1990 |
| EP | 0 423 380 A1 | 4/1991 |
| EP | 0 571 591 B1 | 12/1993 |
| FR | 1 584 684 | 12/1969 |
| GB | 2 064 106 A | 6/1981 |
| GB | 2 181 753 A | 4/1987 |
| WO | WO 93/12028 | 6/1993 |

OTHER PUBLICATIONS

German Search Report.

* cited by examiner

*Primary Examiner*—William A. Rivera
(74) *Attorney, Agent, or Firm*—Kennedy Covington Lobdell & Hickman, LLP

(57) ABSTRACT

A method and an apparatus for contactless yarn monitoring in a textile yarn winding operation wherein a yarn is wound on a bobbin while being delivered lengthwise in a yarn travel direction toward the bobbin and simultaneously executing traversing motions generally perpendicular to the yarn travel direction. A sensor device (6) is provided which detects measured values such as diameter or mass in a moving yarn. The measurement errors caused by the traversing motions may be compensated for by ascertaining position-dependent correction values, monitoring the position of the yarn in the measurement region to determine one or more instantaneous position of the yarn, and compensating for the applicable measurement error is performed on the basis of the instantaneous position of the yarn (3). The invention is applicable to sensor devices (6) that perform measurements in the traversing region of the yarn (3).

20 Claims, 2 Drawing Sheets

|   | A | B | C | ⋮ | J | K | L |
|---|---|---|---|---|---|---|---|
| a | $W_{aA}$ | $W_{bB}$ | $W_{aC}$ | | $W_{aJ}$ | $W_{aK}$ | $W_{aL}$ |
| b | $W_{bA}$ | $W_{bB}$ | $W_{bC}$ | | $W_{bJ}$ | $W_{bK}$ | $W_{bL}$ |
| c | $W_{cA}$ | $W_{cB}$ | $W_{cC}$ | | $W_{cJ}$ | $W_{cK}$ | $W_{cL}$ |
| d | $W_{dA}$ | $W_{dB}$ | $W_{dC}$ | | $W_{dJ}$ | $W_{dK}$ | $W_{dL}$ |
| e | $W_{eA}$ | $W_{eB}$ | $W_{eC}$ | | $W_{eJ}$ | $W_{eK}$ | $W_{eL}$ |

METHOD AND APPARATUS FOR CONTACTLESS YARN MONITORING IN A SPINNING OR BOBBIN WINDING MACHINE

CROSS-REFERENCE TO RELATED APPLICATIONS

This application claims the benefit of German Application DE 19858287, filed Dec. 17, 1998, herein incorporated by reference.

FIELD OF THE INVENTION

The present invention relates to a method and apparatus for contactless yarn monitoring in a spinning or bobbin winding machine and, more particularly, to a method for contactless yarn monitoring in a spinning or bobbin winding machine, having a sensor device for detecting measured values of a yarn moving in a yarn travel direction in which the moving yarn is subject to traversing motions, perpendicular to the yarn travel direction, in the measurement region of the sensor device, and to an apparatus for performing the same.

BACKGROUND OF THE INVENTION

For monitoring the moving yarn in a spinning or bobbin winding machine, capacitive measurement systems, optical measurement systems, and measuring instruments that detect both optical measured values and capacitive values are employed. Such sensor devices are known for instance from European Patent Disclosure EP 0 423 380 A1.

In spinning and bobbin winding machines, traversing motions of the moving yarn are performed in a predetermined way, in order, for example, to create cross-wound bobbins, also known as cheeses, or to prevent the development of furrows in the surface of the typical rubber coating of the draw-off rollers that is meant to protect the yarn.

To suppress such motions of the yarn in the measurement region of a sensor device, the moving yarn, before and after the measurement location, is guided in a stationary position relative to the sensor elements by means of such stationary elements as yarn eyelets or yarn guide baffles, as shown for instance in European Patent Disclosure EP 0 423 380. A disadvantage of such yarn guide elements, however, is that by the contact of the yarn with the yarn guide elements, or the attendant friction, undesired influences or changes occur. For instance, the yarn surface becomes roughened by the eyelets or guide slits.

If the traversing motion of the moving yarn is not suppressed in the measurement region of sensor devices, then the constant change in position or spacing of the yarn from the sensor elements causes measurement errors, which can impair the reliability of the measurements and the adherence to the requisite yarn quality.

German Patent DE 26 02 465 C2 describes an apparatus in which a scattering disk for scattering diffuse light is used, the disk having a height that decreases toward the center, so that when the cross section or volume of a moving yarn is measured, more-reliable measuring results can be attained in a traversing region. If the yarn is traversing from the center toward the edges of the scattering disk, then in the process it increasingly covers the scattering disk with a greater length than in the center of the scattering disk, where the light intensity is higher. The utility of this apparatus is limited to systems that operate optically, with a non-homogeneous light intensity in the measurement region. Measurement errors that occur from changes of position of the yarn toward or away from the scattering disk are not compensated for with this known apparatus, and in a spinning or bobbin winding machine that has many winding stations, it is very complicated and expensive to equip each spinning station and to change the scattering disk manually. Also, the measurement errors that occur in capacitive measuring methods cannot be compensated for with this apparatus.

European Patent Disclosure EP 0 571 591 B1 describes an apparatus for yarn monitoring in which the yarn is monitored in the region of yarn traversing and moves back and forth between the sensor faces of the yarn monitoring apparatus in such a way that it moves toward and away again from the applicable sensor face. The traversing motion of the yarn is utilized for cleaning the sensor faces of the yarn monitoring apparatus, to counteract functional impairment of the measuring method by soiling. During the cyclical traversing motion, when the moving yarn has come quite close to the applicable sensor face, dust and fluff deposits are entrained from the sensor surface. Satisfactory measurement results are furnished by this yarn monitoring apparatus only as long as the yarn to be measured is moving in the measurement region of the sensor device within certain, quite narrow limits. The yarn monitoring device described in European Patent Disclosure EP 0 571 591 B1 is unable, or only inadequately able, to limit greater motions, such as those caused by the traversing motions of the yarn, that exceed these narrow limits. Therefore, measurement errors and considerable fluctuations in the measurement results, both of which impair the reliability and usability of measurement values for yarn monitoring, and can thus impair the yarn quality, must still be expected. The limitation of the yarn motion is accomplished by means of stops over which the yarn runs. The rounded edges and the use of wear-resistant material are indications of the considerable friction which is created by the movement of the yarn against the stops, which act as yarn guide elements, and which thus engender the above-described disadvantages of yarn guide elements.

SUMMARY OF THE INVENTION

It is accordingly an object of the invention to improve the monitoring of moving yarn upon changes of position of the moving yarn in the measurement region.

This object is attained according to the invention by a method for contactless yarn monitoring in a textile yarn winding operation. In such an operation, yarn is wound on a bobbin while being delivered lengthwise in a yarn travel direction toward the bobbin. At the same time, the yarn simultaneously executes traversing motions generally perpendicular to the yarn travel direction. According to the present invention, a sensor device is provided for detecting measured values of the yarn moving in the yarn travel direction. The sensor device has a measurement region within which the moving yarn is subject to changes of position. Position-dependent correction values are ascertained which correspond to measurement errors caused by changes of position of the yarn. The position of the yarn is monitored to determine at least one instantaneous position of the yarn, and the applicable measurement error is compensated for on the basis of the instantaneous position of the yarn.

The invention achieves a number of advantages. Compensating for the applicable instantaneous value of the measurement error as a function of the constantly monitored instantaneous position of the yarn in the measurement region assures the reliability of the measured values for yarn monitoring and thus assures the yarn quality regardless of the type of sensor device, for both optical and capacitive measurement methods. Values stored in memory can be used as standard values for other spinning stations and other spinning machines, as long as these spinning stations are structurally identical to the spinning station at which the measurements were made. The allocation and storage and memory of the values can be done in the form of a matrix.

Accurate, universally usable ascertainment of the yarn position in the measurement region is done by detecting the position of the yarn directly in the measurement region of the sensor device.

According to another aspect of the invention, the position of the yarn guide may be monitored in order to ascertain the change in position caused by the traversing motion of the yarn guide and to ascertain the applicable position of the yarn in the measurement region of the sensor device from the relationship between the position of the yarn and the position of the yarn guide, thus making a space-saving embodiment possible when only limited installation space is available at the sensor device. No additional expense for sensor parts is then necessary to detect the yarn position in this region. Both the location of the yarn guide in the cyclical course of the traversing motion and the location and geometric shape of storage brackets or guide baffles, which compensate for the difference in length between the oblique position and middle position of the yarn during the yarn guide stroke in order to prevent brief increases of yarn tension, should be taken into account in determining the positioning of the yarn in the measurement region. Each position of the yarn in the measurement region can be associated with a respective position of the yarn guide. Accurate determination of the position of the yarn guide in the measurement region is thus possible, without performing a detection in the measuring region itself. Determining the position of the yarn from the position of the yarn guide can be done by a mathematical method.

The empirical ascertainment of correction values from measurements with a comparison body at different positions, distributed within the measurement region of the sensor device, can be done quickly and simply. A reference yarn is expediently employed as the comparison body for the measurement.

According to a further feature of the invention, a sensor device is used for reference value ascertainment at a point along the yarn travel path where no traversing motion of the yarn is occurring. A measurement may be made to determine the correction value in each case at a first point along the yarn travel path where no traversing motion of the yarn is occurring and a second measurement may be made at a second point along the yarn travel path where the yarn is executing the traversing motion. The comparison of the measurement results from the two measurements, each made at the same location on the yarn, shows the position-dependent measurement error especially clearly. Thus, even measurement errors that are created by the sensor device itself, for example because of soiling or shifting, can be recognized and eliminated.

The invention can be used universally both with sensor devices that act simultaneously as yarn monitors and as yarn cleaners for correcting imperfections in the yarn, and with sensor devices in which a combination of optical and capacitive measuring methods is used for measured value detection. Such an embodiment of the sensor device is also space-saving, and by combining the functions, it lessens the expense for the required parts.

Another aspect of the invention provides that the sensor device further comprises a measurement gap which extends in the direction of the traversing motion of the yarn to prevent contact of the yarn with parts of the sensor device, and thus prevents undesired friction, even in the presence of a relatively major traversing motion of the yarn.

The invention makes it possible to obtain very accurate measured values even in the traversing regions of the yarn, without having to accept negative influences on the yarn surface from additional yarn guide elements for maintaining a certain measurement position of the yarn, and without undesirably limiting the traversing motion. Disposing a yarn monitor, which monitors the moving yarn contactlessly, in the yarn path either upstream or downstream from the pair of draw-off rollers, makes it possible, for instance, to wind bobbins with a very low winding tension.

Further details of the invention can be learned from the drawings.

DETAILED DESCRIPTION OF THE DRAWINGS

DETAILED DESCRIPTION OF THE PREFERRED EMBODIMENTS

Figure 1:
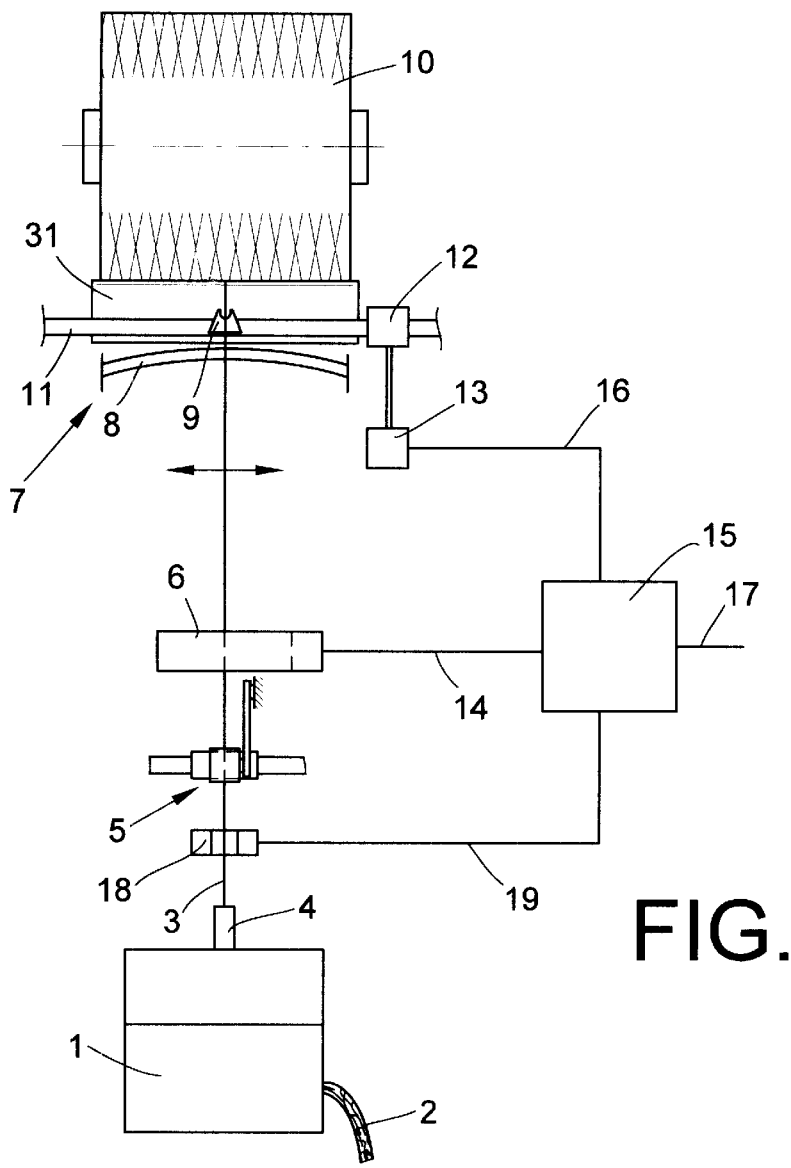
FIG. 1 is a schematic view of a spinning station in accordance with one embodiment of the present invention.

A sliver 2 is introduced into the spinning box 1, shown in FIG. 1, of an open-end spinning machine. The yarn 3 produced is drawn off from the spinning box 1 via the draw-off tubule 4 by means of the pair of draw-off rollers 5. The yarn 3 then passes through a sensor device 6 and over a storage bracket 8, whereupon, by means of the traversing motion of the yarn guide 9 of a yarn guide device 7, the yarn 3 is wound up over a predetermined width to form a cross-wound bobbin, or cheese, 10. The cheese 10 is driven by means of a friction roller 31. The yarn guide 9 is clamped to a yarn guide rod 11, which is moved back and forth by a yarn guide gear 12. The movement of the yarn guide gear 12 is effected by a drive device 13.

The sensor device 6 for monitoring the moving yarn 3 is disposed above the pair of draw-off rollers 5, in the traversing region of the yarn 3. The sensor device 6 communicates over a communication interface 14 with a data processing system 15, which receives the signals transmitted by the sensor device 6. The data processing system 15 communicates with the drive device 13 over an additional communication interface 16. The drive device 13 may be embodied as an electric motor, in which case the position of the yarn guide 9 may be determined from the revolutions and the angular position of the motor shaft, and thus the position of the yarn 3 in the measurement region of the sensor device 6 may also be determined. In the cyclical course of the traversing motion, the effects of the location and geometric shape of the storage brackets or guide baffles on the position of the yarn 3 are also taken into account. The data processing system 15 performs an allocation of the applicable position of the yarn 3 in the measurement region of the sensor device 6 and the applicable measured value transmitted by the sensor device 6. No other components are needed for detecting the position of the yarn 3, and the monitoring can be done in a simple way at the drive device 13 at a readily accessible location where there is enough room.

In the illustration in FIG. 1, in the region between the draw-off tubule 4 and the pair of draw-off rollers 5, there is an additional sensor device 18, which communicates with the data processing system 15 over a communication interface 19. In the exemplary embodiment of FIG. 1, no traversing motion takes place at this location. With an apparatus known per se (not shown for the sake of simplicity) for detecting and monitoring the motion of the yarn 3 in the travel direction, which for example has an initiator that serves to measure the draw-off speed of the yarn 3 and the rotary motion at a shaft of the pair of draw-off rollers 5, the measured values detected by the sensor device 18 can be associated with the measured values that are detected at the same location of the yarn 3 by the sensor device 6. Comparing the respective measured values detected by the sensor device 18 and by the sensor device 6 ascertains the measurement error caused by the traversing process, and this error is then associated with the respective position of the yarn 3 in the measurement gap of the sensor device 6. The values thus ascertained are stored in memory. However, the values can also be transmitted onward over a communication interface 17, by way of which the data processing system 15 communicates with other spinning stations, data processing devices, or spinning machines (not shown).

Figure 2:
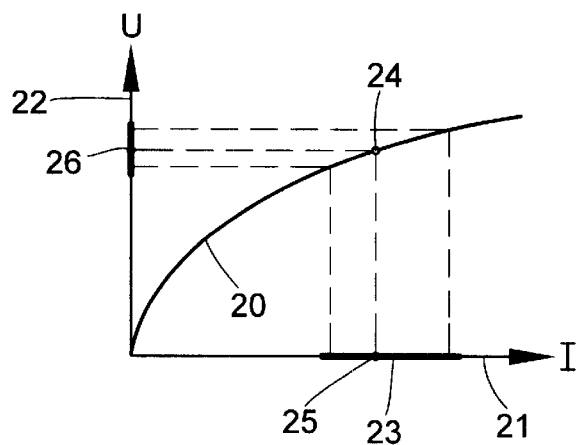
FIG. 2 is a graphical illustration showing an exemplary characteristic curve representing the relationship between light intensity and voltage in a photoelectric device embodiment of the sensor device of FIG. 1.

As shown in FIG. 2, the characteristic curve 20 of a photoelectric device, used for example as a sensor element 29, illustrates the dependency between the light intensity I, plotted on the abscissa 21, and the voltage U, plotted on the ordinate 22, for forming the signal of the photo element. The characteristic curve 20 is not linear in its course. Based upon the characteristics of the yarn, such as the yarn diameter or the yarn count, a region 23 is selected for the measurement in which the course of the characteristic curve 20 is nearly linear. An intensity value 25 and a voltage value 26 correspond to the characteristic value 24. Changes in the position of the yarn 3 in the measurement region of the sensor device 6 lead to a change in the intensity of the incident light and thus to a change in the voltage on which the signal generation is based. Since the intensity of the incident light serves as a measure of the diameter of the yarn 3, the changes in the intensity of the incident light, which are caused by the change in position of the yarn 3, are also interpreted as changes in the diameter of the yarn 3 and thus lead to measurement errors.

Figures 3, 4:
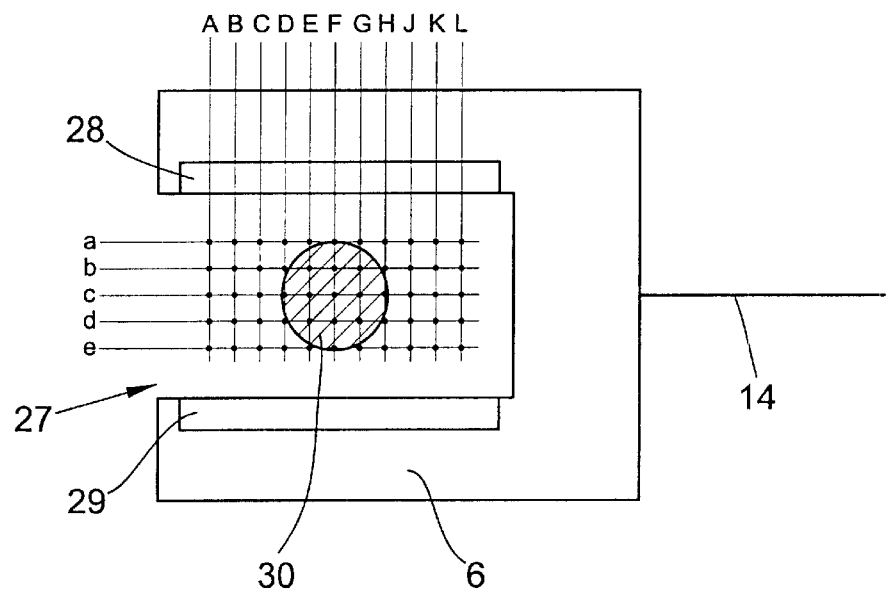
FIG. 3 is a cross-sectional view of an embodiment of the sensor device of FIG. 1 showing sensor elements and a measuring gap.
FIG. 4 is a graphical illustration of an allocation matrix for measured values obtained using the spinning station of FIG. 1.

FIG. 3 shows the sensor device 6 with a measurement gap 27 and with sensor elements 28 and 29. Depending on the embodiment, the sensor elements 28 and 29 are used for both optical and capacitive measuring methods. The measurement region is covered by an imaginary dot matrix, in which the horizontally extending rows of points are designated by lower-case letters, and the vertically extending rows of points are designated by capital letters. As shown in FIG. 3, a comparison body 30 is positioned for a measurement in such a way that its cross-sectional center point is located on the matrix point cF. This matrix point cF is thus the instantaneous position of the comparison body 30.

Both the position of the comparison body 30 and the position of the moving yarn 3 in the measuring region of the sensor device 6 can be detected for instance with sensors positioned at the measuring gap 27 of the sensor device 6. These sensors cooperate around the body being measured, which may be, for example, the comparison body 30 or the moving yarn 3, in an arrangement of the kind known from French Patent FR 158 4684. Light sources emit light which causes shading or projection onto the sensors, and from the length and location of the shading or projection, the position of the body being measured can be determined unambiguously and precisely.

By sequencing through the matrix points, measured values associated with the various matrix points are ascertained empirically. The measured values are compared with the known diameter of the comparison body 30, and for the applicable matrix point, the measurement error or a correction value for the applicable measurement is ascertained. Both the measured values and the correction values can be stored in a computer memory, associated with the points of a matrix of the kind shown in FIG. 4, by means of the data processing system 15. The value WbC, for instance, is assigned to the matrix point bC.

During operation of the open-end spinning machine, the moving yarn 3 moves within the measuring gap 27 of the sensor device 6, and while it is executing the traversing motion, it is instantaneously positioned, for example, at the matrix point cD. The compensation for the measurement error, caused at matrix point cD by the change of position of the yarn 3 is effected by means of the correction value assigned to matrix point cD.

The data pertaining to the position determination and the empirically ascertained correction values for a particular yarn can be collected at a first spinning station, for instance. The position determination of the yarn 3 can be done via a mathematical calculation method, with which the applicable position of the yarn 3 is calculated from the applicable position of the yarn guide 9. The calculation takes into account the location of the yarn guide in the cyclical course of the traversing motion, and also, to the extent that they affect the position of the yarn 3 in the measurement region, the location and the geometric shape of the storage brackets or guide baffles. The values stored in memory can be called up or predetermined as standard values for other spinning stations or spinning machines by the data processing system 15 over the communication interface 17, as long as these spinning stations are, for instance, structurally identical to the spinning station at which the measurements are made. As a result, the requisite effort for batch changes can be kept slight.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In a textile yarn winding operation wherein a yarn is wound on a bobbin while being delivered lengthwise in a yarn travel direction toward the bobbin and simultaneously executing traversing motions generally perpendicular to the yarn travel direction, a method for contactless monitoring of the yarn comprising:
   providing a sensor device for detecting a measured value of a yarn quality other than presence or position of the yarn moving in the yarn travel direction, wherein the sensor device has a measurement region, and wherein the moving yarn is subject to changes of position in the measurement region of the sensor device,
   ascertaining a position-dependent correction value corresponding to measurement errors caused by changes of position of the yarn,
   storing the position-dependent correction value,
   monitoring the position of the yarn in the measurement region,
   determining an instantaneous position of the yarn, and
   compensating for the applicable measurement error on the basis of the instantaneous position of the yarn by linking the position-dependent correction value with the measured value detected at the instantaneous position of the yarn.

2. The method of claim 1, characterized further by detecting the instantaneous position of the yarn directly in the measurement region of the sensor device.

3. The method of claim 1, characterized further by providing a yarn guide, wherein the yarn guide executes a traversing motion, wherein at least a portion of the measurement errors are caused by the traversing motion of the yarn guide, monitoring the position of the yarn guide to determine at least one instantaneous position of the yarn guide, and ascertaining the applicable position of the yarn in the measurement region of the sensor device from the relationship between the instantaneous position of the yarn and the instantaneous position of the yarn guide.

4. The method in accordance with claim 1, characterized further by determining the correction value empirically from measurements performed utilizing a comparison body located at different positions distributed within the measurement region of the sensor device.

5. The method of claim 4, characterized further by providing a reference yarn as the comparison body for the measurements.

6. The method in accordance with claim 1, and further comprising causing the yarn to move in a yarn travel path having a first location at which no traversing motion of the yarn occurs, and a second location at which the yarn executes the traversing motion, ascertaining the position-dependent correction value by making a respective first measurement at the first location along the yarn travel path, making a second measurement at the second location along the yarn travel path, and comparing the applicable measurement results with one another, wherein both measurements take place at the same location on the moving yarn.

7. The method in accordance with claim 1, wherein the measured value detection comprising a combination of optical measuring and capacitive measuring.

8. The method in accordance with claim 1, wherein the sensor device is a yarn monitor for monitoring movement of the yarn and a yarn cleaner to correct imperfections in the yarn.

9. The method according to claim 1, characterized in that the measurement error is an error in the measured value of a diameter of the yarn.

10. An apparatus for performing contactless yarn monitoring in a textile yarn winding operation wherein a yarn is wound on a bobbin while being delivered lengthwise in a yarn travel direction toward the bobbin and simultaneously executing traversing motions generally perpendicular to the yarn travel direction, the apparatus comprising:
    a sensor device for detecting a measured value other than presence or position of the yarn, the sensor device having a measurement region wherein the moving yarn is subject to changes of position in the measurement region,
    correction-value ascertainment means for determining correction values corresponding to measurement errors caused by changes of position of the yarn,
    position-determining means for determining at least one instantaneous position of the moving yarn in the measurement region, and
    compensation means for compensating for the applicable measurement error for the detected measured value on the basis of the instantaneous position of the yarn.

11. The apparatus in accordance with claim 10, characterized in that at least one position-determining means is disposed in the sensor device.

12. The apparatus in accordance with claim 11, characterized in that at least one position-determining means comprises a detection device for determining the position of a yarn guide and a calculator for calculating the position of the yarn in the sensor device.

13. The apparatus in accordance with claim 11, characterized in that the sensor device further comprises a measurement gap, the measurement gap extending in the direction of the traversing motions of the yarn.

14. The apparatus in accordance with claim 11, characterized in that the sensor device further comprises yarn clearing means for correcting imperfections in the yarn.

15. The apparatus in accordance with claim 10, wherein the measured value is a diameter of the yarn.

16. In a textile yarn winding operation wherein a yarn is wound on a bobbin while being delivered lengthwise in a yarn travel direction toward the bobbin and simultaneously executing traversing motions generally perpendicular to the yarn travel direction, a method for contactless monitoring of the yarn comprising:
    providing a sensor device for detecting a measured value of a yarn quality of the yarn moving in the yarn travel direction, wherein the sensor device has a measurement region, and wherein the moving yarn is subject to changes of position in the measurement region of the sensor device,
    ascertaining a position-dependent correction value corresponding to measurement errors caused by changes of position of the yarn,
    storing the position-dependent correction value,
    monitoring the position of the yarn in the measurement region,
    determining an instantaneous position of the yarn, and
    compensating for the applicable measurement error on the basis of the instantaneous position of the yarn by linking the position-dependent correction value with the measured value detected at the instantaneous position of the yarn;
    whereby the correction value is determined empirically from measurements performed utilizing a comparison body located at different positions distributed within the measurement region of the sensor device.

17. The method of claim 16, characterized further by providing a reference yarn as the comparison body for the measurements.

18. In a textile yarn winding operation wherein a yarn is wound on a bobbin while being delivered lengthwise in a yarn travel direction toward the bobbin and simultaneously executing traversing motions generally perpendicular to the yarn travel direction, a method for contactless monitoring of the yarn comprising:

providing a sensor device for detecting a measured value of a yarn quality of the yarn moving in the yarn travel direction, wherein the sensor device has a measurement region, and wherein the moving yarn is subject to changes of position in the measurement region of the sensor device, ascertaining a position-dependent correction value corresponding to measurement errors caused by changes of position of the yarn, storing the position-dependent correction value, monitoring the position of the yarn in the measurement region, determining an instantaneous position of the yarn, compensating for the applicable measurement error on the basis of the instantaneous position of the yarn by linking the position-dependent correction value with the measured value detected at the instantaneous position of the yarn, and causing the yarn to move in a yarn travel path having a first location at which no traversing motion of the yarn occurs, and a second location at which the yarn executes the traversing motion, ascertaining the position-dependent correction value by making a respective first measurement at the first location along the yarn travel path, making a second measurement at the second location along the yarn travel path, and comparing the applicable measurement results with one another, wherein both measurements take place at the same location on the moving yarn.

19. In a textile yarn winding operation wherein a yarn is wound on a bobbin while being delivered lengthwise in a yarn travel direction toward the bobbin and simultaneously executing traversing motions generally perpendicular to the yarn travel direction, a method for contactless monitoring of the yarn comprising:

providing a sensor device for detecting a measured value of a yarn quality of the yarn moving in the yarn travel direction, wherein the sensor device has a measurement region, and wherein the moving yarn is subject to changes of position in the measurement region of the sensor device, the sensor device comprising a yarn monitor for monitoring movement of the yarn and a yarn cleaner to correct imperfections in the yarn;

ascertaining a position-dependent correction value corresponding to measurement errors caused by changes of position of the yarn, storing the position-dependent correction value, monitoring the position of the yarn in the measurement region, determining an instantaneous position of the yarn, and compensating for the applicable measurement error on the basis of the instantaneous position of the yarn by linking the position-dependent correction value with the measured value detected at the instantaneous position of the yarn.

20. In a textile yarn winding operation wherein a yarn is wound on a bobbin while being delivered lengthwise in a yarn travel direction toward the bobbin and simultaneously executing traversing motions generally perpendicular to the yarn travel direction, a method for contactless monitoring of the yarn comprising:

providing a sensor device for detecting a diameter of the yarn moving in the yarn travel direction, wherein the sensor device has a measurement region, and wherein the moving yarn is subject to changes of position in the measurement region of the sensor device, ascertaining a position-dependent correction value corresponding to measurement errors caused by changes of position of the yarn, storing the position-dependent correction value, monitoring the position of the yarn in the measurement region, determining an instantaneous position of the yarn, and compensating for the applicable measurement error on the basis of the instantaneous position of the yarn by linking the position-dependent correction value with the diameter detected at the instantaneous position of the yarn.

* * * * *